US011125129B2

(12) United States Patent
Tomecki

(10) Patent No.: US 11,125,129 B2
(45) Date of Patent: Sep. 21, 2021

(54) ARRANGEMENT OF AT LEAST TWO ENGINE-COMPARTMENT EXHAUST SYSTEM COMPONENTS FOR AN INTERNAL COMBUSTION ENGINE OF A MOTOR VEHICLE, AND MOTOR VEHICLE

(71) Applicant: VOLKSWAGEN AKTIENGESELLSCHAFT, Wolfsburg (DE)

(72) Inventor: Matthias Tomecki, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/749,483

(22) Filed: Jan. 22, 2020

(65) Prior Publication Data

US 2020/0232360 A1    Jul. 23, 2020

(30) Foreign Application Priority Data

Jan. 22, 2019   (DE) ............... 10 2019 101 487.5

(51) Int. Cl.
*F01N 3/035*     (2006.01)
*F01N 13/00*     (2010.01)
(Continued)

(52) U.S. Cl.
CPC ......... *F01N 3/035* (2013.01); *B01D 46/0027* (2013.01); *B01D 53/9454* (2013.01);
(Continued)

(58) Field of Classification Search
CPC . B01D 46/0027; B01D 53/9454; F01N 13/00; F01N 13/009; F01N 13/10;
(Continued)

(56) References Cited

U.S. PATENT DOCUMENTS

2011/0073088 A1    3/2011  Hubbard et al.
2011/0158871 A1*   6/2011  Arnold ................ F01N 3/035
                                                 423/212
(Continued)

FOREIGN PATENT DOCUMENTS

CN        102762283 A      10/2012
CN        103748332 A       4/2014
(Continued)

OTHER PUBLICATIONS

Search report for European Patent Application No. 20 15 3051, dated May 4, 2020.
(Continued)

*Primary Examiner* — Brandon D Lee
(74) *Attorney, Agent, or Firm* — Pearl Cohen Zedek Latzer Baratz LLP

(57) ABSTRACT

An arrangement of at least two engine-compartment exhaust system components is provided for an internal combustion engine of a motor vehicle. The at least two engine-compartment exhaust system components are arranged one behind the other downstream from the internal combustion engine of the motor vehicle and are connected to one another by means of a first connecting body, so that exhaust gas from the internal combustion engine can be directed in succession through the at least two exhaust system components in the direction of an exhaust system. In addition, the two exhaust system components are also arranged behind a manifold device of the internal combustion engine by means of a second connecting body. A motor vehicle is also provided which comprises at least one such arrangement.

8 Claims, 14 Drawing Sheets

(51) Int. Cl.
   *F02M 26/15* (2016.01)
   *B01D 46/00* (2006.01)
   *B01D 53/94* (2006.01)
   *F01N 3/10* (2006.01)
   *F01N 13/10* (2010.01)
   *F01N 3/021* (2006.01)

(52) U.S. Cl.
   CPC ............. *F01N 3/021* (2013.01); *F01N 3/101* (2013.01); *F01N 13/009* (2014.06); *F01N 13/10* (2013.01); *F02M 26/15* (2016.02); *F01N 2340/00* (2013.01); *F01N 2340/02* (2013.01); *F01N 2560/00* (2013.01)

(58) Field of Classification Search
   CPC .. F01N 13/1805; F01N 13/1838; F01N 3/021; F01N 3/035; F01N 3/101; F01N 3/20; F01N 2340/00; F01N 2340/02; F01N 2560/00; F02M 26/15
   See application file for complete search history.

(56) References Cited

U.S. PATENT DOCUMENTS

| | | |
|---|---|---|
| 2012/0304623 A1 | 12/2012 | Springer et al. |
| 2014/0202136 A1 | 7/2014 | Sprute |
| 2015/0107228 A1* | 4/2015 | Klingmann ............. F01N 3/035 60/274 |
| 2016/0201534 A1 | 7/2016 | Lambert et al. |
| 2017/0002713 A1 | 1/2017 | Balenovic et al. |
| 2018/0258822 A1* | 9/2018 | Kuramashi ......... F01N 13/0097 |
| 2018/0347425 A1* | 12/2018 | Otsuka ................ F02D 41/0235 |
| 2019/0316510 A1* | 10/2019 | Kuramashi ............ B01D 53/94 |

FOREIGN PATENT DOCUMENTS

| | | |
|---|---|---|
| CN | 104661730 A | 5/2015 |
| CN | 108571354 A | 9/2018 |
| DE | 101 59 158 A1 | 6/2003 |
| DE | 10 2011 111 590 A1 | 2/2013 |
| DE | 10 2016 100 151 A1 | 7/2016 |
| DE | 10 2015 212 485 A1 | 1/2017 |
| DE | 10 2017 102 874 A1 | 8/2018 |
| DE | 10 2018 001 426 A1 | 9/2018 |
| EP | 2 650 042 A1 | 10/2013 |
| WO | WO 2009/038221 A1 | 3/2009 |

OTHER PUBLICATIONS

Search report for German Patent Application No. 10 2019 101 487.5, dated Sep. 25, 2019.
Office Action for Chinese Patent Application No. 202010074121.6, dated Jun. 11, 2021.

* cited by examiner

ARRANGEMENT OF AT LEAST TWO ENGINE-COMPARTMENT EXHAUST SYSTEM COMPONENTS FOR AN INTERNAL COMBUSTION ENGINE OF A MOTOR VEHICLE, AND MOTOR VEHICLE

FIELD OF THE INVENTION

The invention relates to an arrangement of at least two engine-compartment exhaust system components for an internal combustion engine of a motor vehicle, and to a motor vehicle.

BACKGROUND OF THE INVENTION

As environmental legislation becomes more and more stringent, the vehicle industry is also endeavoring to optimize current and future products with regard to various environmental aspects both during production and during the use phase itself. One notable aspect during the use phase is air pollution control. In this context, a wide variety of exhaust gas treatment methods and exhaust gas treatment components are already in use in today's motor vehicles. The type and shape of the drive units used in the vehicles are diverse and range from pure diesel units and conventional drives using a gasoline engine to hybrid drives and electric drives. Today, one example of a common exhaust gas treatment component for a pure diesel unit is a particulate filter. Special particulate filters are also being increasingly provided for gasoline engines.

The installation space in modern vehicles is scarce due to the abovementioned and other requirements, for example with regard to safety aspects or the provision of additional comfort aspects, so that new vehicle concepts are becoming increasingly compact.

As already mentioned, a wide variety of solutions are known from the prior art which deal with exhaust gas treatment methods and exhaust gas treatment components.

For instance, a system for filtering and oxidizing solids that are generated by a gasoline direct injection engine can be regarded as being known from printed publication US 2011/0073088 A1. In one embodiment, the air/fuel of the engine cylinder is adjusted such that soot can oxidize on an upstream particulate filter while exhaust gases are processed efficiently in a downstream catalytic converter.

An exhaust gas aftertreatment device and an associated method for a gasoline engine can also be regarded as being known from printed publication US 2012/0304623 A1. In one example of that document, an exhaust gas aftertreatment device for a gasoline engine comprises a filter body with porous filter walls through which exhaust gas flows in order to remove soot, the porous filter walls containing a first catalyst material and regions of the filter walls having a coating made of a second catalyst material. A particulate filter and a catalyst can thus be provided in a common aftertreatment device.

A control device for an internal combustion engine can also be regarded as being known from printed publication WO 2009/038221 A1. In that publication, a provision is made that an internal combustion engine carries out a stoichiometric combustion operation under the control of the control device in order to provide a stoichiometric air-fuel ratio as a basic control for an air-fuel ratio. A particulate filter is provided in an exhaust duct of the engine in order to collect particulates contained in the exhaust gas. If it is judged that the PM filter has an excessively elevated temperature, fuel cut is prevented during a deceleration. Otherwise, before fuel cut is prohibited, the air-fuel ratio of the exhaust gas is controlled in such a way that the atmosphere of the PM filter is made to be somewhat leaner than the stoichiometric air-fuel ratio.

SUMMARY OF THE INVENTION

It is the object of the invention to provide an arrangement for exhaust system components for an internal combustion engine of a motor vehicle that ensures a particularly compact design in a motor vehicle.

According to the invention, a provision is made that an arrangement of at least two engine-compartment exhaust system components is provided for an internal combustion engine of a motor vehicle. These at least two engine-compartment exhaust system components are arranged one behind the other downstream from the internal combustion engine of the motor vehicle and are connected to one another by means of a first connecting body, so that exhaust gas from the internal combustion engine can be directed in succession through the at least two exhaust system components in the direction of an exhaust system. The two exhaust system components are also arranged behind a manifold device of the internal combustion engine by means of a second connecting body. According to the invention, a length in the exhaust gas flow direction of the second connecting body is no more than 0.07 m, particularly no more than 0.03 m, preferably no more than 0.02 m.

In other words, a length from an outlet of the manifold device to an inlet of the exhaust gas system components arranged foremost on the exhaust gas flow side is no more than 0.07 m, particularly no more than 0.03 m, preferably no more than 0.02 m. An especially compact construction in a motor vehicle can thus be ensured.

In another preferred embodiment of the invention, a motor vehicle is provided which comprises at least one arrangement. To the extent practicable, the advantages mentioned above also apply to the motor vehicle presented.

Other preferred embodiments of the invention will become apparent from the remaining features, which are indicated in the subclaims.

In addition, a provision is made in another preferred embodiment of the invention that the first exhaust system component is a three-way catalytic converter and the second exhaust system component is a particulate filter, particularly a gasoline particulate filter, the three-way catalytic converter being arranged foremost in the exhaust gas flow direction and the particulate filter being arranged downstream from the three-way catalytic converter above the first connecting body. An especially compact construction in a motor vehicle can thus be ensured. An exhaust gas from the internal combustion engine is thus at least partially cleaned and/or treated.

In another preferred embodiment of the invention, a provision is made that the three-way catalytic converter has a diameter that is equal to or smaller than the particulate filter, particularly the gasoline particulate filter. An especially compact construction in a motor vehicle can thus be even better ensured. In the context of the present description, a "diameter" is understood to mean an outer diameter of the respective component transverse to the exhaust gas flow direction. In the case of a non-cylindrical shape, the diameter denotes the largest cross-sectional extension of the component.

Furthermore, in another preferred embodiment of the invention, a provision is made that both the three-way catalytic converter and the particulate filter, particularly the gasoline particulate filter, are each wider than they are long. An especially compact construction in a motor vehicle can thus be even better ensured.

In the context of the present description, the terms "long" or "length" refer to the extension of the respective component along the exhaust gas flow direction. On the other hand, in the context of the present description, the terms "wide" or "width" refer to the (maximum) diameter transverse to the length.

In addition, a provision is made in another preferred embodiment of the invention that the dimensions for the three-way catalytic converter and for the particulate filter, particularly the gasoline particulate filter are width: from 0.110 to 0.125 m×length: from 0.105 to 0.120 m. An especially compact construction in a motor vehicle can thus be even better ensured.

In another preferred embodiment of the invention, a provision is also made that the three-way catalytic converter is longer than it is wide and the particulate filter, particularly the gasoline particulate filter, is wider than it is long. An especially compact construction in a motor vehicle can thus be even better ensured.

Furthermore, a provision is made in another preferred embodiment of the invention that the dimensions for the three-way catalytic converter are width: from 0.110 to 0.125 m×length: from 0.144 to 0.157 m and for the particulate filter, particularly the gasoline particulate filter, width: from 0.124 to 0.137 m×length: from 0.121 to 0.132 m. An especially compact construction in a motor vehicle can thus be even better ensured.

In addition, a provision is made in another preferred embodiment of the invention that the three-way catalytic converter is wider than it is long and the particulate filter, particularly the gasoline particulate filter, is longer than it is wide. An especially compact construction in a motor vehicle can thus be even better ensured.

A provision is also made in another preferred embodiment of the invention that the dimensions for the three-way catalytic converter are width: from 0.110 to 0.125 m×length: 0.105 to 0.120 m and for the particulate filter, particularly the gasoline particulate filter, width: from 0.110 to 0.125 m×length: from 0.144 to 0.157 m. An especially compact construction in a motor vehicle can thus be even better ensured.

Furthermore, a provision is made in another preferred embodiment of the invention that the first connecting body is smaller than the three-way catalytic converter and/or the first connecting body is smaller than the particulate filter, particularly the gasoline particulate filter. An especially compact construction in a motor vehicle can thus be even better ensured. In the context of the present description, the terms "smaller" or "larger" refer to the volumes of the respective components, particularly to their lengths in the exhaust gas flow direction.

In addition, a provision is made in another preferred embodiment of the invention that the second connecting body is smaller than the three-way catalytic converter and/or the second connecting body is smaller than the particulate filter, particularly the gasoline particulate filter. An especially compact construction in a motor vehicle can thus be even better ensured.

In another preferred embodiment of the invention, a provision is also made that an exhaust gas recirculation system is arranged downstream from the three-way catalytic converter and particulate filter, particularly the gasoline particulate filter. An especially compact construction in a motor vehicle can thus be even better ensured.

In another preferred embodiment of the invention, a provision is also made that at least one measuring device is provided in the first connecting body. This measuring device can comprise at least one lambda sensor. An especially compact construction in a motor vehicle can thus be even better ensured.

Finally, a provision is made in another preferred embodiment of the invention that at least one measuring device is provided in the second connecting body. This measuring device can comprise at least one lambda sensor. An especially compact construction in a motor vehicle can thus be even better ensured.

Unless otherwise stated in the individual case, the various embodiments of the invention mentioned in this application can be advantageously combined with one another.

BRIEF DESCRIPTION OF THE DRAWINGS

The invention will be explained below in exemplary embodiments with reference to the accompanying drawing. In the drawings.

DETAILED DESCRIPTION OF THE INVENTION

Figure 1:
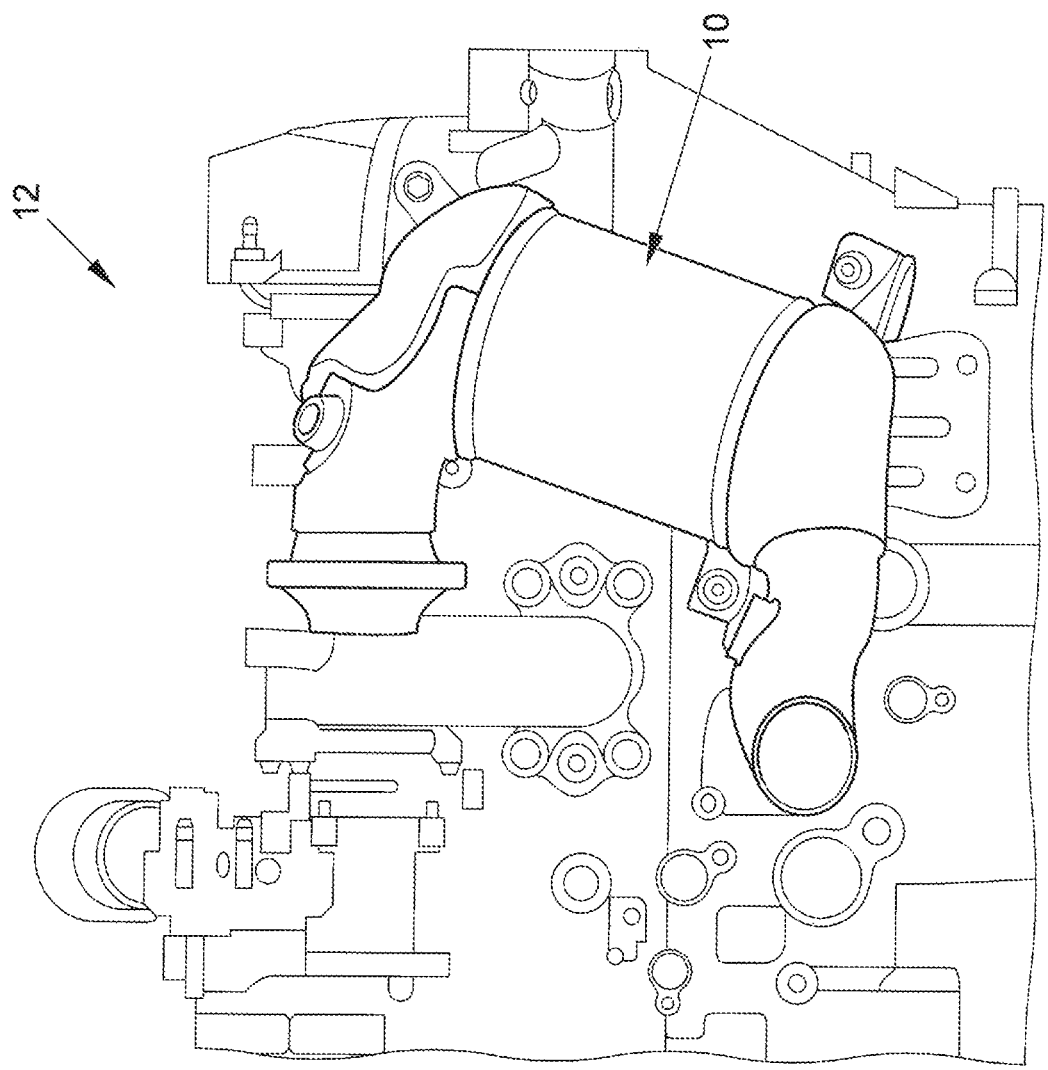
FIG. 1 shows a conventional engine-compartment three-way catalytic converter in an installed state according to the prior art.

FIG. 1 shows a conventional engine-compartment three-way catalytic converter 10 in an installed state according to the prior art. FIG. 1 shows only an internal combustion engine 12 of a motor vehicle (not shown in further detail) in which this conventional three-way catalytic converter 10 is shown installed.

Figure 2:
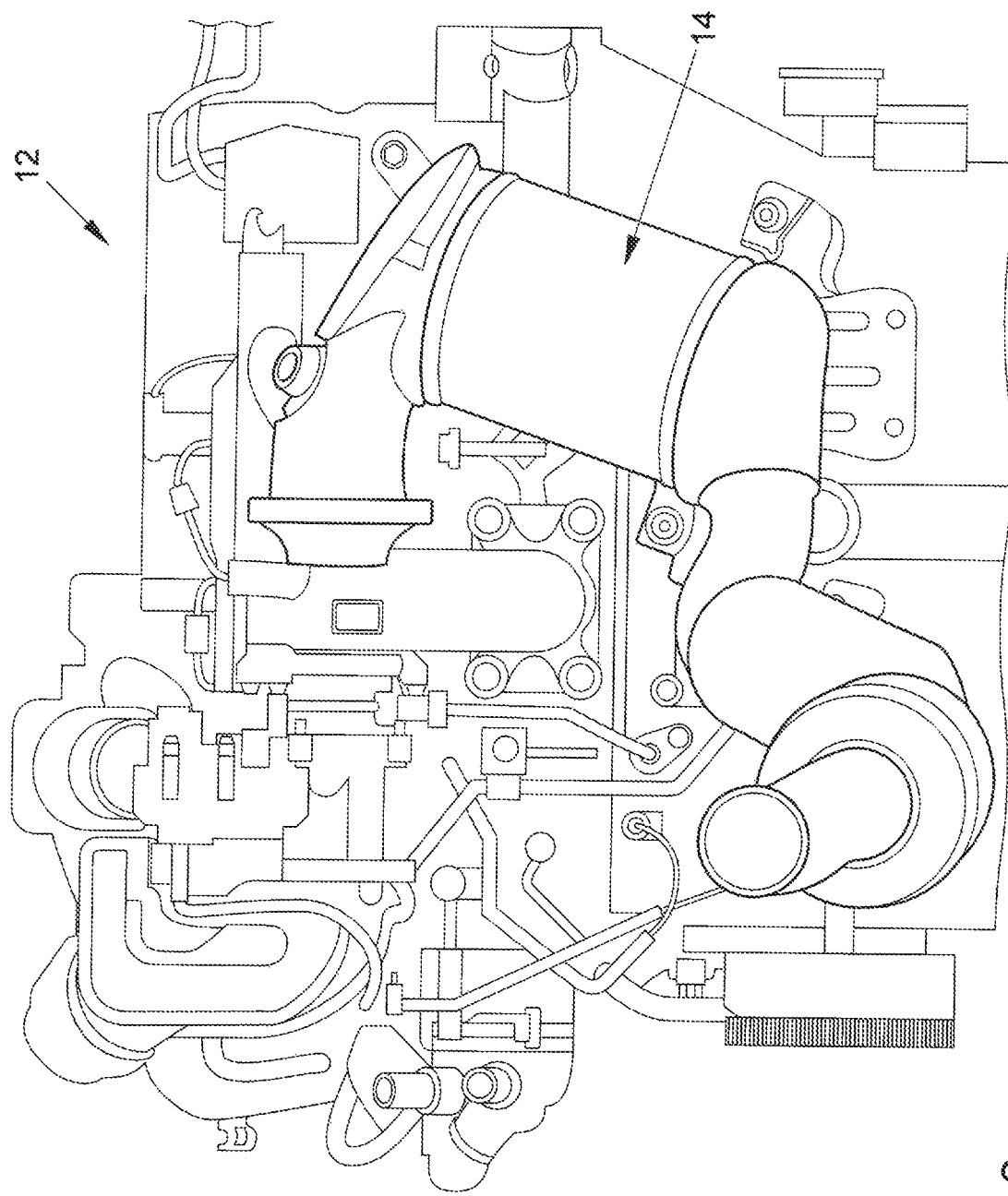
FIG. 2 shows a conventional engine-compartment three-way catalytic converter gasoline particulate device in an installed state according to the prior art.

FIG. 2 shows a conventional engine-compartment three-way catalytic converter gasoline particulate device 14 in an installed state according to the prior art. FIG. 2 shows only an internal combustion engine 12 of a motor vehicle (not shown in further detail) in which this conventional three-way catalytic converter gasoline particulate device 14 is shown installed.

Figure 3:
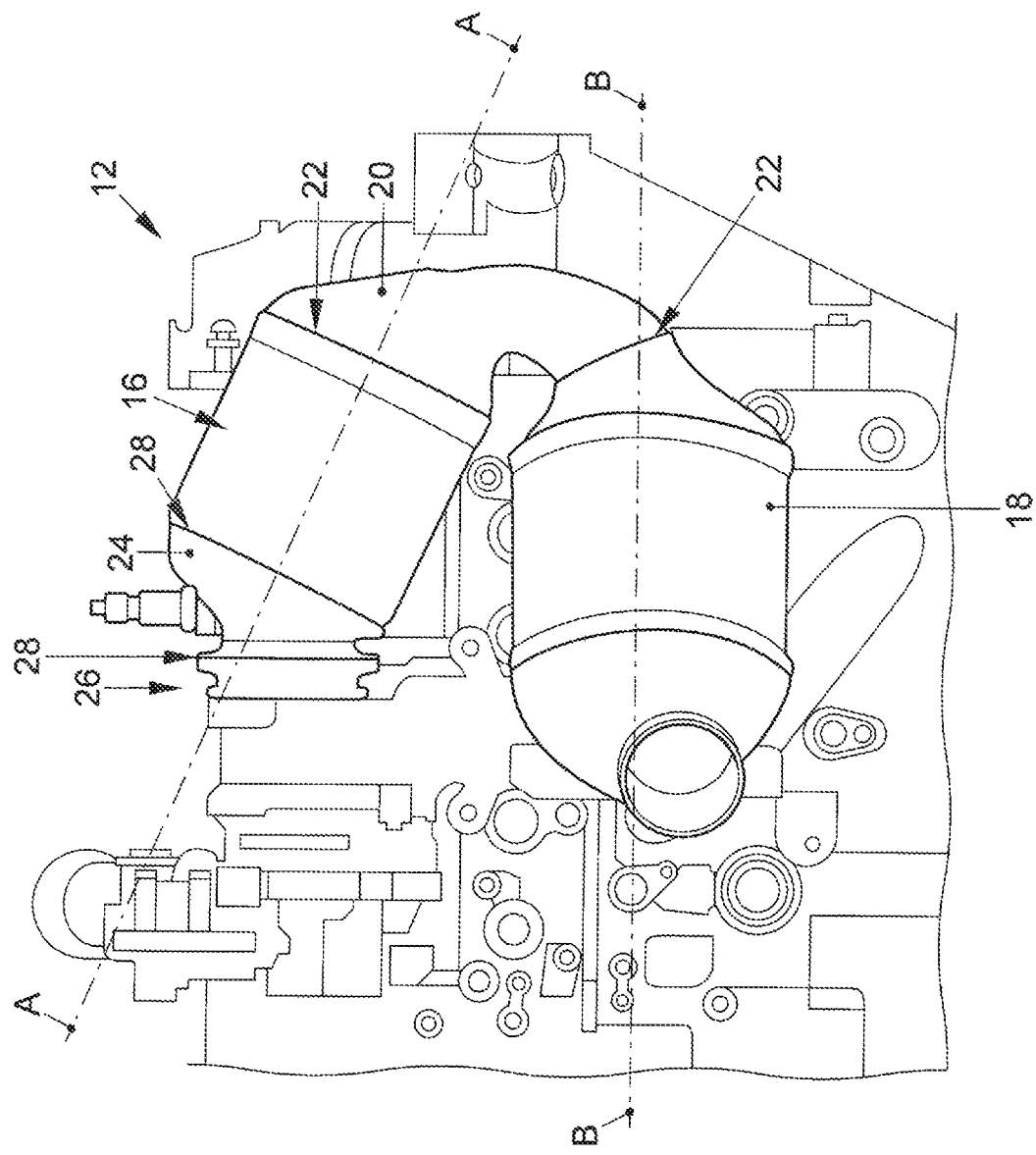
FIG. 3 shows an arrangement of two engine-compartment exhaust system components for an internal combustion engine of a motor vehicle.

FIG. 3 shows an arrangement of two engine-compartment exhaust system components for an internal combustion engine 12 of a motor vehicle (not shown in further detail). One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions are as follows: for the three-way catalytic converter, width: 0.118364 m×length: 0.1143 m (in inches, these dimensions are: 4.66"×4.5") and for the particulate filter, particularly the gasoline particulate filter, width: 0.13208 m×length: 0.1016 m (in inches, these dimensions are: 5.2"×4.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12. In this case, this is a substantially horizontal installation position of the gasoline particulate filter 18 relative to an image plane and an installation position of the three-way catalytic converter 16 that is provided above the gasoline particulate filter 18.

A drawn-in centerline B-B of the gasoline particulate filter 18 is shown to be offset by an angle of approximately 30° in the clockwise direction relative to a drawn-in centerline A-A of the three-way catalytic converter 16. In other words, the three-way catalytic converter 16 is not only shown above the gasoline particulate filter 18 relative to the gasoline particulate filter 18, but also at an angle of approximately 30° relative to a respective central body axis of the respective exhaust system components.

The three-way catalytic converter 16 is also arranged directly on a manifold device 26 of the internal combustion engine 12 by means of a second connecting body 24, the second connecting body 24 being designed to specify a relative installation position of the three-way catalytic converter 16 to the manifold device 26 on account of its connection points 28

Figure 4:
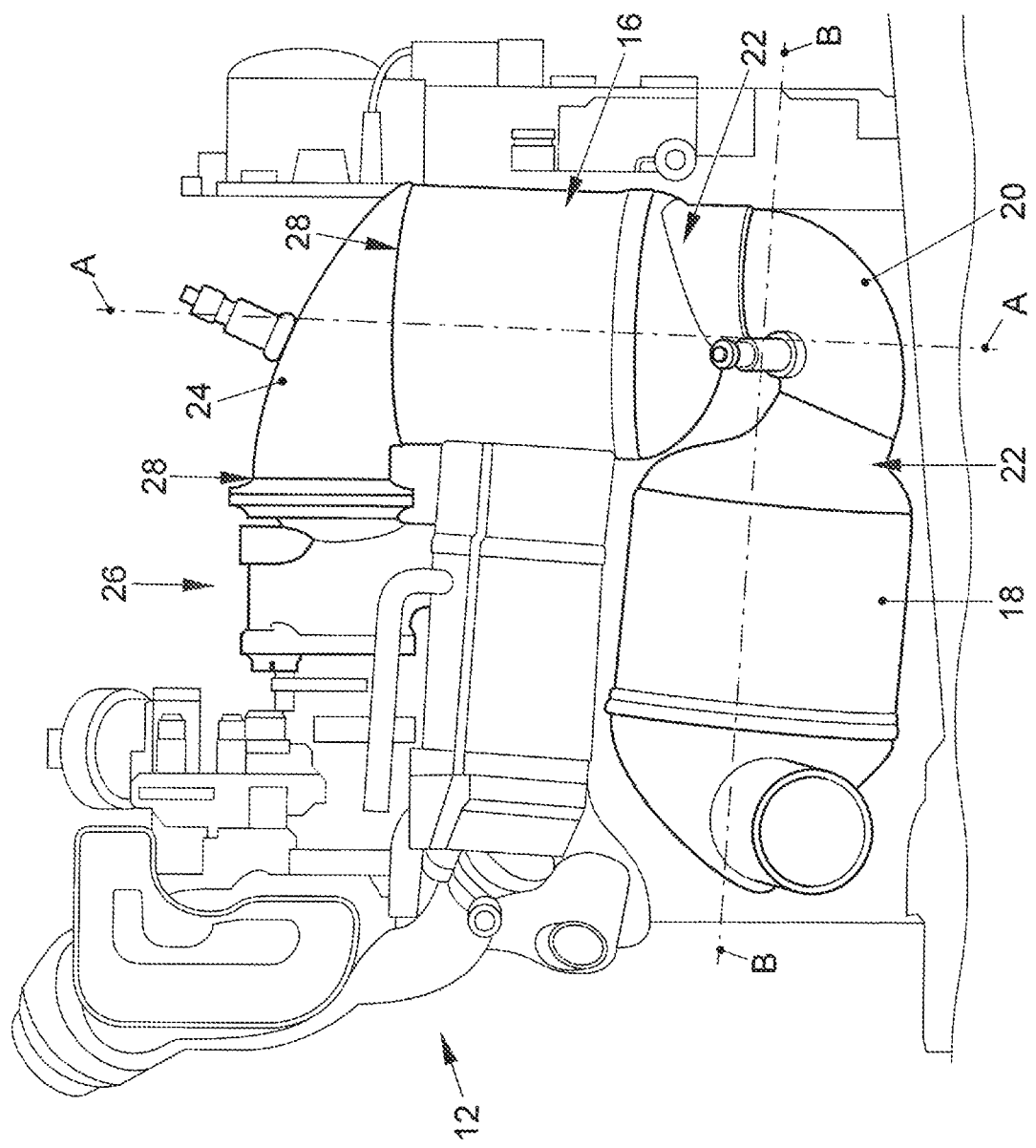
FIG. 4 shows another arrangement of two engine-compartment exhaust system components for an internal combustion engine of a motor vehicle.

FIG. 4 shows another arrangement of two engine-compartment exhaust system components for an internal combustion engine 12 of a motor vehicle 32.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions are as follows: for the three-way catalytic converter, width: 0.118364 m×length: 0.1143 m (in inches, these dimensions are: 4.66"×4.5") and for the particulate filter, particularly the gasoline particulate filter, width: 0.13208 m×length: 0.1016 m (in inches, these dimensions are: 5.2"×4.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is a hybrid unit in this case. In this case, this is a substantially horizontal installation position of the gasoline particulate filter 18 relative to an image plane and an installation position of the three-way catalytic converter 16 that is provided above the gasoline particulate filter 18.

A drawn-in centerline B-B of the gasoline particulate filter 18 is shown to be offset by an angle of approximately 90° in the clockwise direction relative to a drawn-in centerline A-A of the three-way catalytic converter 16. In other words, the three-way catalytic converter 16 is not only shown above the gasoline particulate filter 18 relative to the gasoline particulate filter 18, but also at an angle of approximately 90° relative to a respective central body axis of the respective exhaust system components.

The three-way catalytic converter 16 is also arranged directly on a manifold device 26 of the internal combustion engine 12 by means of a second connecting body 24, the second connecting body 24 being designed to specify a relative installation position of the three-way catalytic converter 16 to the manifold device 26 on account of its connection points 28.

Figure 5:
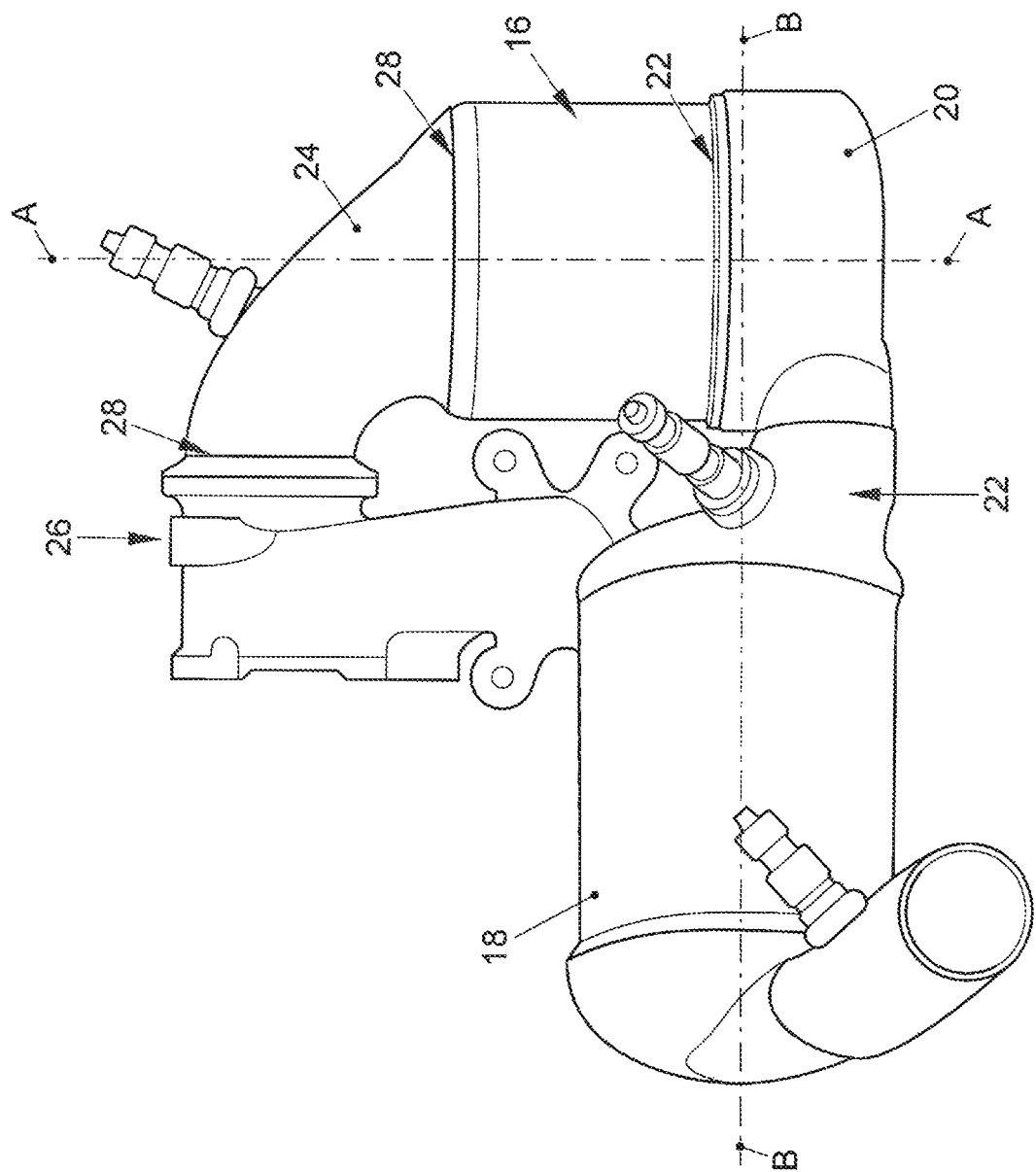
FIG. 5 shows another arrangement of two engine-compartment exhaust system components for an internal combustion engine of a motor vehicle.

FIG. 5 shows another arrangement of two engine-compartment exhaust system components for an internal combustion engine 12 of a motor vehicle.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions are as follows: for the three-way catalytic converter, width: 0.118364 m×length: 0.1143 m (in inches, these dimensions are: 4.66"×4.5") and for the particulate filter, particularly the gasoline particulate filter, width: 0.118364 m×length: 0.1524 m (in inches, these dimensions are: 4.66"×6.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12 (not shown in further detail). In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 90° in the clockwise direction. In other words, the three-way catalytic converter 16 is not only shown above the gasoline particulate filter 18 relative to the gasoline particulate filter 18, but also at an angle of approximately 90° relative to a respective central body axis of the respective exhaust system components.

The three-way catalytic converter 16 is also arranged directly on a manifold device 26 of the internal combustion engine 12 by means of a second connecting body 24, the second connecting body 24 being designed to specify a relative installation position of the three-way catalytic converter 16 to the manifold device 26 on account of its connection points 28.

Figure 6:
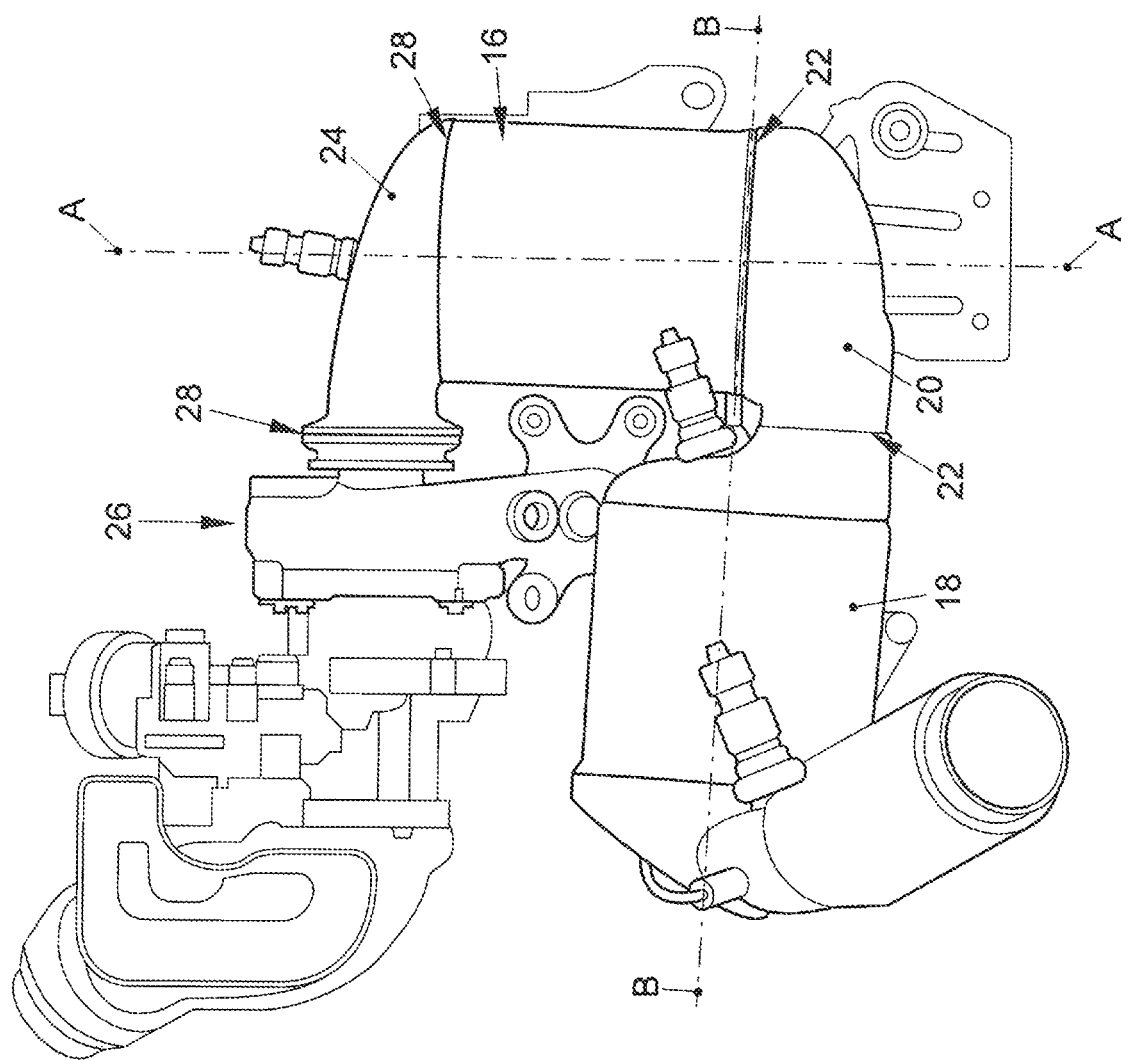
FIG. 6 shows another arrangement of two engine-compartment exhaust system components for an internal combustion engine of a motor vehicle.

FIG. 6 shows another arrangement of two engine-compartment exhaust system components for an internal combustion engine 12 of a motor vehicle.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions are as follows: for the three-way catalytic converter, width: 0.118364 m×length: 0.1524 m (in inches, these dimensions are: 4.66"×6.0") and for the particulate filter, particularly the gasoline particulate filter, width: 0.13208 m×length: 0.127 m (in inches, these dimensions are: 5.2"×5.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12 (not shown in further detail). In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 90° in the clockwise direction. In other words, the three-way catalytic converter 16 is not only shown above the gasoline particulate filter 18 relative to the gasoline particulate filter 18, but also at an angle of approximately 90° relative to a respective central body axis of the respective exhaust system components.

The three-way catalytic converter 16 is also arranged directly on a manifold device 26 of the internal combustion engine 12 (not shown in further detail) by means of a second connecting body 24, the second connecting body 24 being designed to specify a relative installation position of the three-way catalytic converter 16 to the manifold device 26 on account of its connection points 28.

Figure 7:
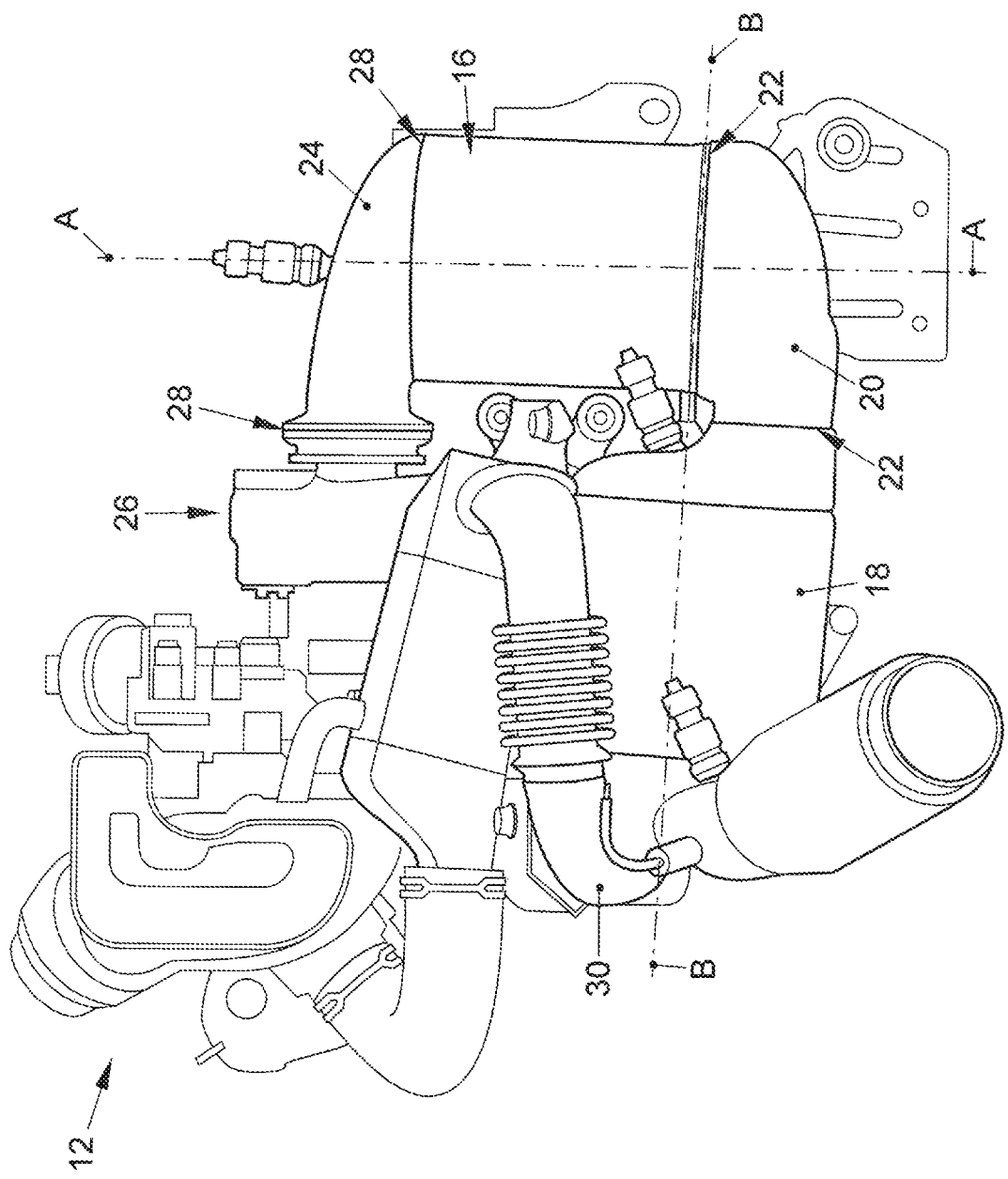
FIG. 7 shows an arrangement of two engine-compartment exhaust system components for an internal combustion engine of a motor vehicle with exhaust gas recirculation system.

FIG. 7 shows an arrangement of two engine-compartment exhaust system components for an internal combustion engine of a motor vehicle with exhaust gas recirculation system.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions are as follows: for the three-way catalytic converter, width: 0.118364 m×length: 0.1524 m (in inches, these dimensions are: 4.66"×6.0") and for the particulate filter, particularly the gasoline particulate filter, width: 0.13208 m×length: 0.127 m (in inches, these dimensions are: 5.2"×5.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is illustrated only partially. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 90° in the clockwise direction. In other words, the three-way catalytic converter 16 is not only shown above the gasoline particulate filter 18 relative to the gasoline particulate filter 18, but also at an angle of approximately 90° relative to a respective central body axis of the respective exhaust system components.

The three-way catalytic converter 16 is also arranged directly on a manifold device 26 of the internal combustion engine 12 (shown only partially) by means of a second connecting body 24, the second connecting body 24 being designed to specify a relative installation position of the three-way catalytic converter 16 to the manifold device 26 on account of its connection points 28.

In addition, FIG. 7 shows a recirculation line 30 of an exhaust gas recirculation system, which is arranged downstream from the gasoline particulate filter 18.

Figure 8:
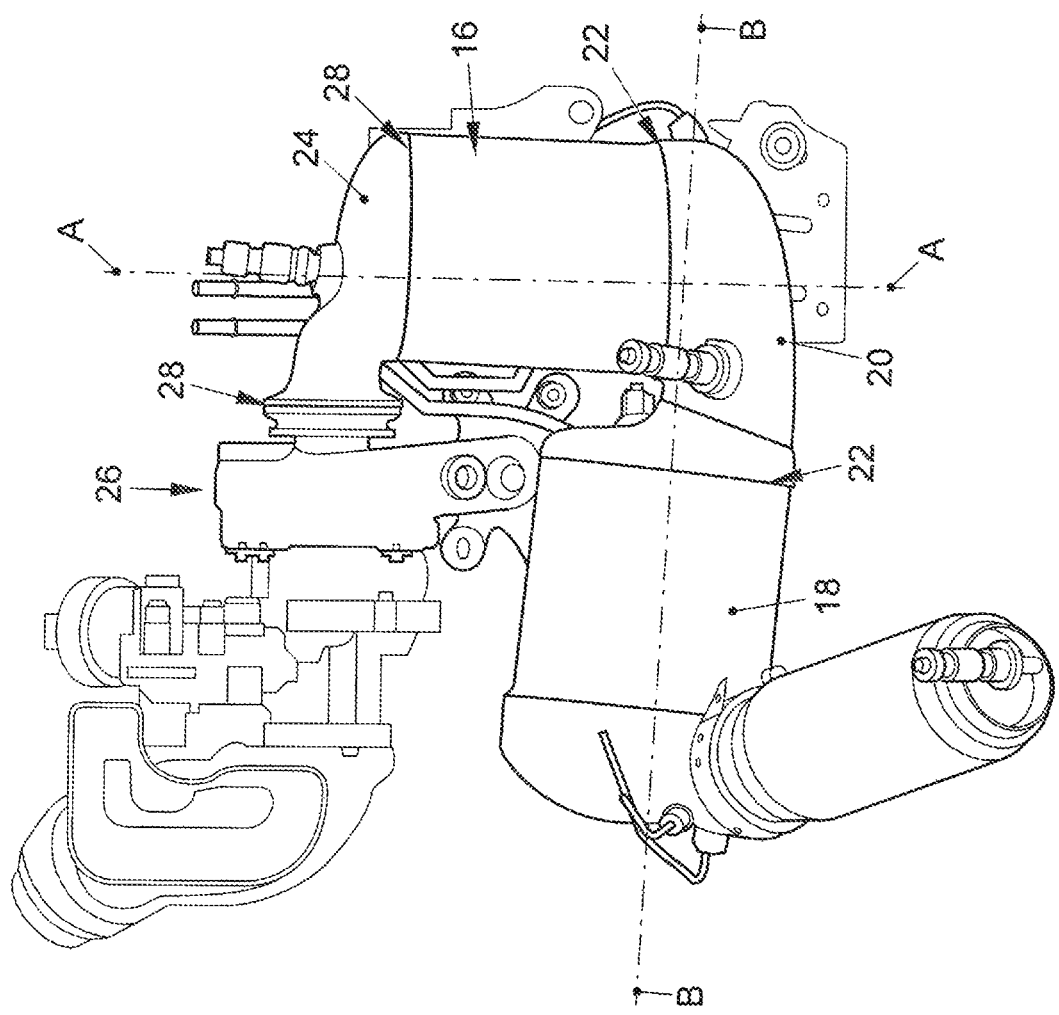
FIG. 8 shows another arrangement of two engine-compartment exhaust system components for an internal combustion engine of a motor vehicle.

FIG. 8 shows another arrangement of two engine-compartment exhaust system components for an internal combustion engine 12 of a motor vehicle.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions are as follows: for the three-way catalytic converter, width: 0.118364 m×length: 0.1524 m (in inches, these dimensions are: 4.66"×6.0") and for the particulate filter, particularly the gasoline particulate filter, width: 0.13208 m×length: 0.127 m (in inches, these dimensions are: 5.2"×5.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is illustrated only partially. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 85° in the clockwise direction. In other words, the three-way catalytic converter 16 is not only shown above the gasoline particulate filter 18 relative to the gasoline particulate filter 18, but also at an angle of approximately 85° relative to a respective central body axis of the respective exhaust system components.

The three-way catalytic converter 16 is also arranged directly on a manifold device 26 of the internal combustion engine 12 (shown only partially) by means of a second connecting body 24, the second connecting body 24 being designed to specify a relative installation position of the three-way catalytic converter 16 to the manifold device 26 on account of its connection points 28.

Figure 9:
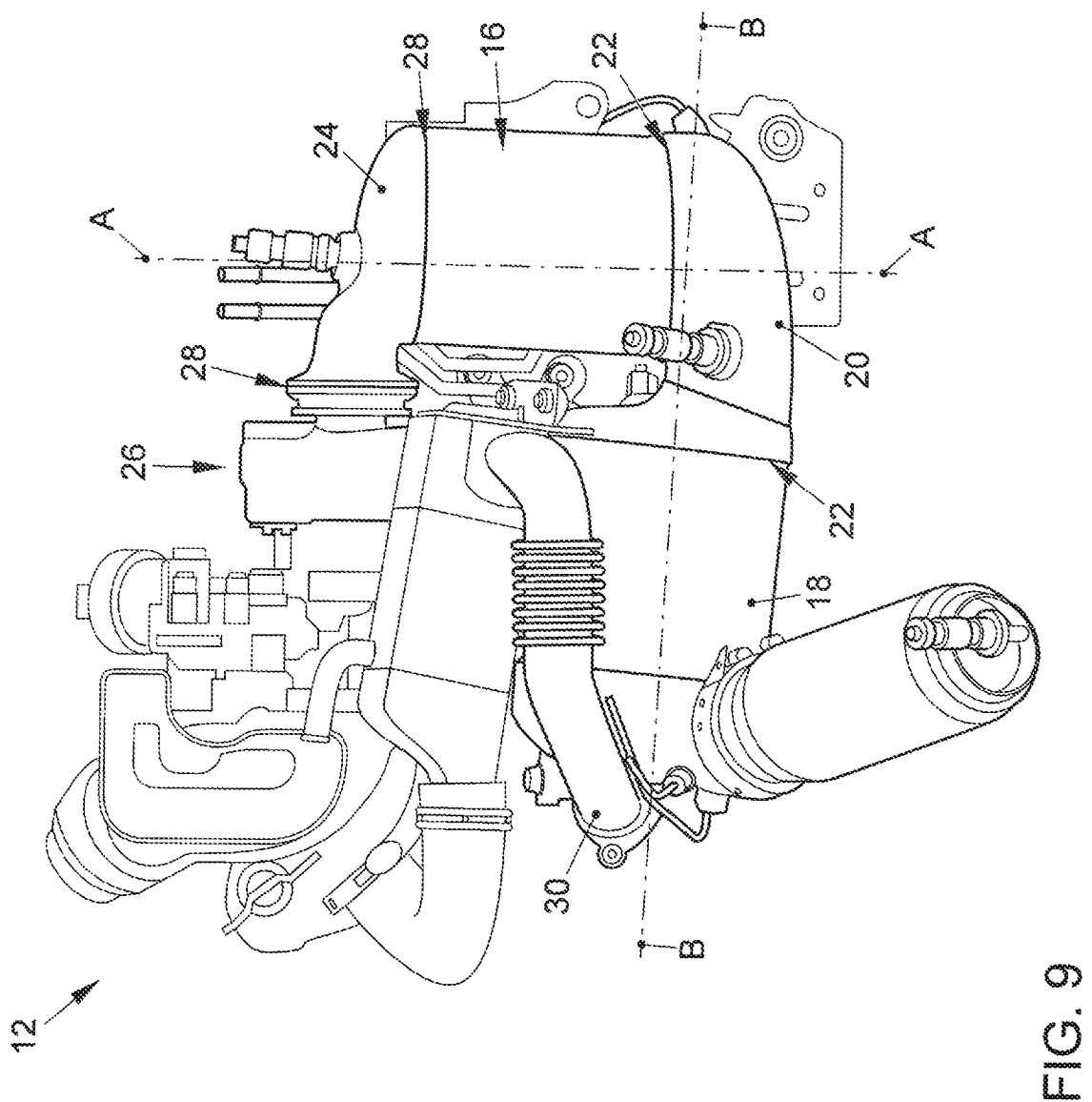
FIG. 9 shows another arrangement of two engine-compartment exhaust system components for an internal combustion engine of a motor vehicle with exhaust gas recirculation system.

FIG. 9 shows another arrangement of two engine-compartment exhaust system components for an internal combustion engine 12 of a motor vehicle with exhaust gas recirculation system. One of the engine-compartment exhaust system components is a three-way catalytic converter 16 that is designed according to the invention, and the other component is a gasoline particulate filter 18 designed according to the invention. Both exhaust system components have a substantially cylindrical structure.

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is illustrated only partially. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 85° in the clockwise direction. In other words, the three-way catalytic converter 16 is not only shown above the gasoline particulate filter 18 relative to the gasoline particulate filter 18, but also at an angle of approximately 85° relative to a respective central body axis of the respective exhaust system components.

The three-way catalytic converter 16 is also arranged directly on a manifold device 26 of the internal combustion engine 12 (shown only partially) by means of a second connecting body 24, the second connecting body 24 being designed to specify a relative installation position of the three-way catalytic converter 16 to the manifold device 26 on account of its connection points 28.

In addition, FIG. 9 shows a recirculation line 30 of an exhaust gas recirculation system, which is arranged downstream from the gasoline particulate filter 18.

Figure 10:
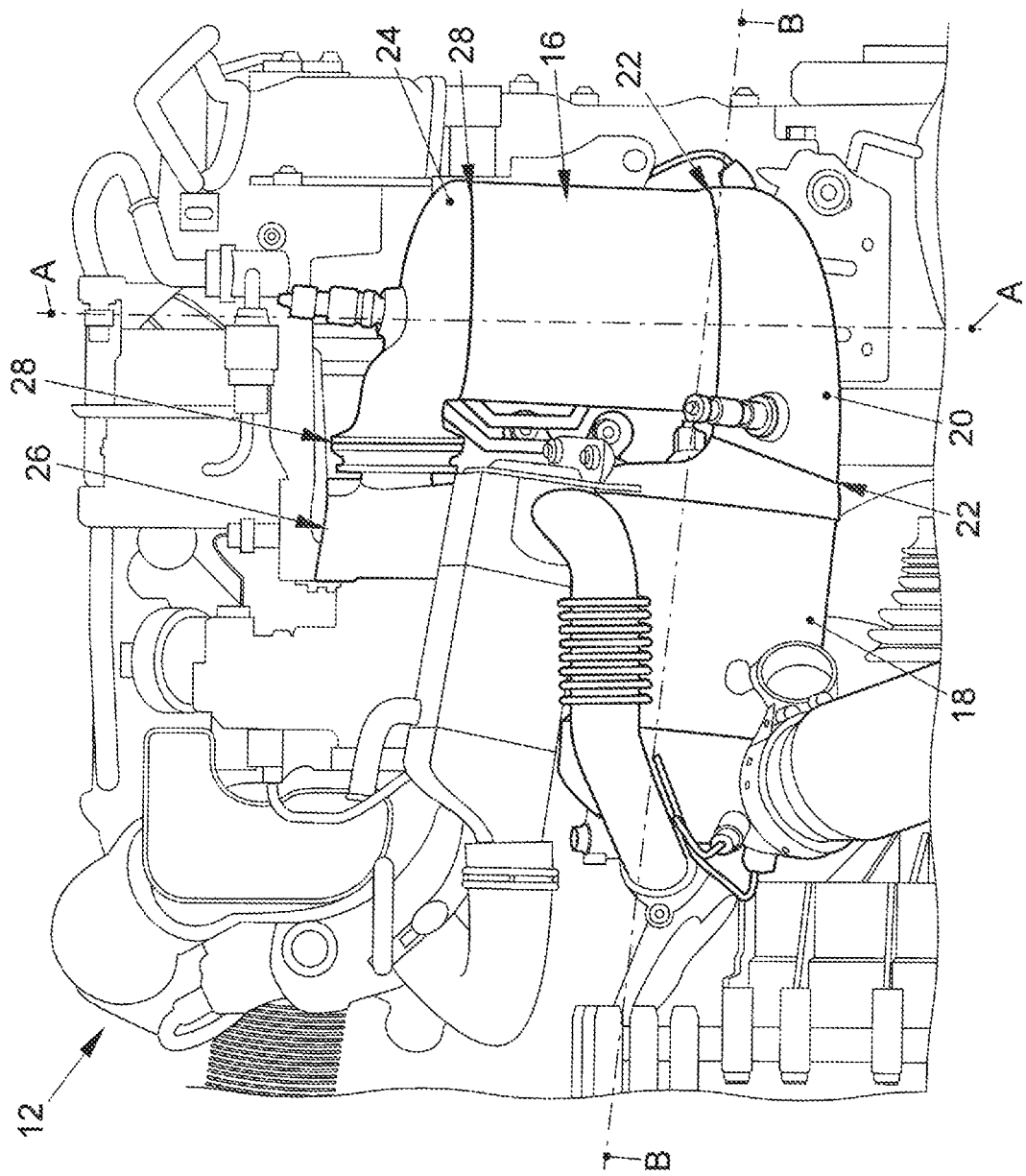
FIG. 10 shows another arrangement of two engine-compartment exhaust system components for an internal combustion engine of a motor vehicle with exhaust gas recirculation system.

FIG. 10 shows another arrangement of two engine-compartment exhaust system components for an internal combustion engine 12 of a motor vehicle with exhaust gas recirculation system.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the illustrated internal combustion engine 12. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16. Relative to a drawn-in centerline A-A of the three-way catalytic converter 16, a drawn-in centerline B-B of the gasoline particulate filter 18 is shown to be offset by an angle of approximately 85° in the clockwise direction. In other words, the three-way catalytic converter 16 is not only shown above the gasoline particulate filter 18 relative to the gasoline particulate filter 18, but also at an angle of approximately 85° relative to a respective central body axis of the respective exhaust system components.

The three-way catalytic converter 16 is also arranged directly on a manifold device 26 of the internal combustion engine 12 (shown only partially) by means of a second connecting body 24, the second connecting body 24 being designed to specify a relative installation position of the three-way catalytic converter 16 to the manifold device 26 on account of its connection points 28.

In addition, FIG. 10 shows a recirculation line 30 of an exhaust gas recirculation system, which is arranged downstream from the gasoline particulate filter 18.

Figure 11:
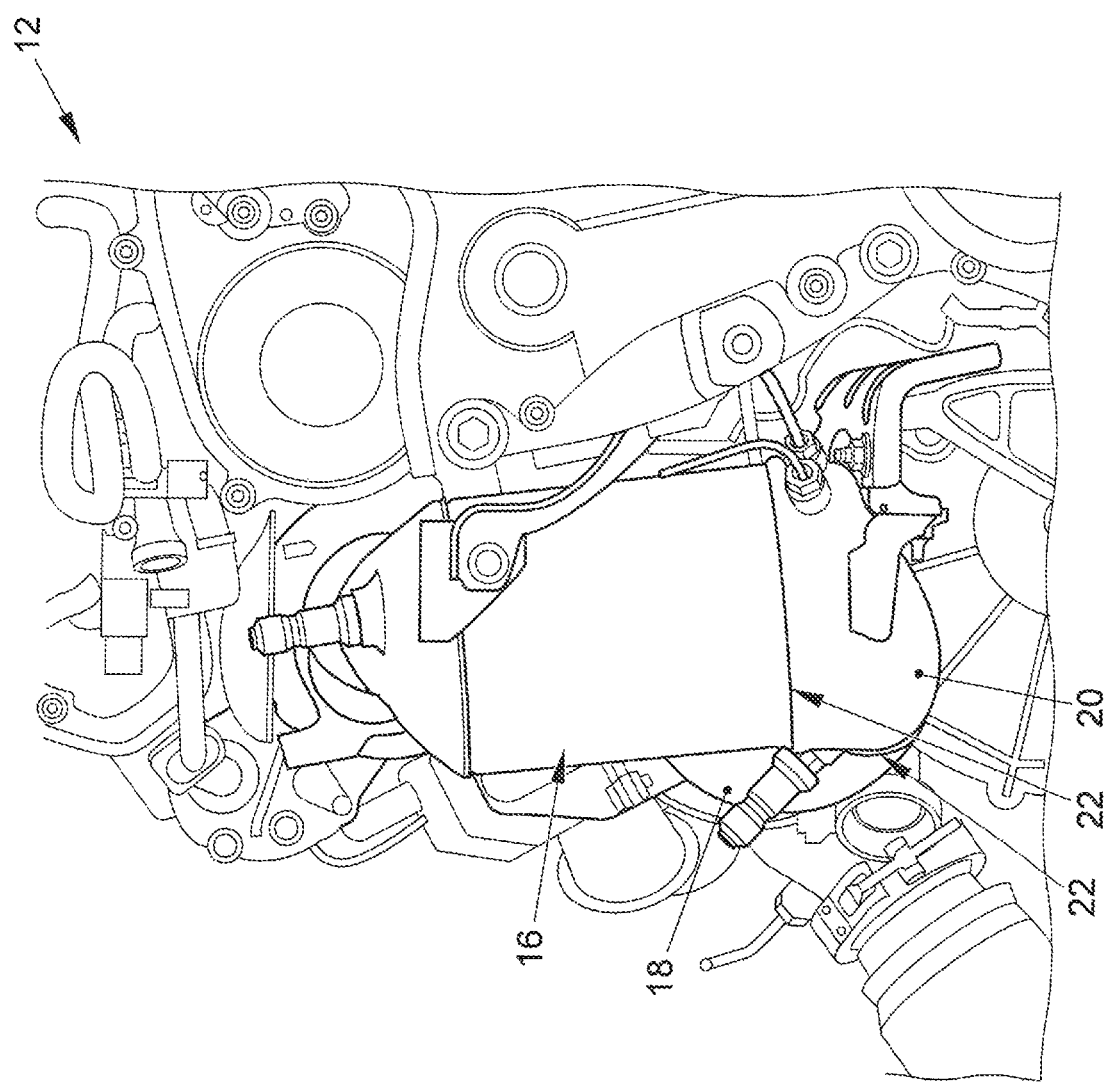
FIG. 11 shows a side view of an arrangement of two engine-compartment exhaust system components for an internal combustion engine of a motor vehicle with exhaust gas recirculation system.

FIG. 11 shows side view of an arrangement of two engine-compartment exhaust system components for an internal combustion engine 12 of a motor vehicle with exhaust gas recirculation system.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is illustrated only partially. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

FIG. 11 is a side view of the arrangement that is illustrated in FIG. 10.

Figure 12:
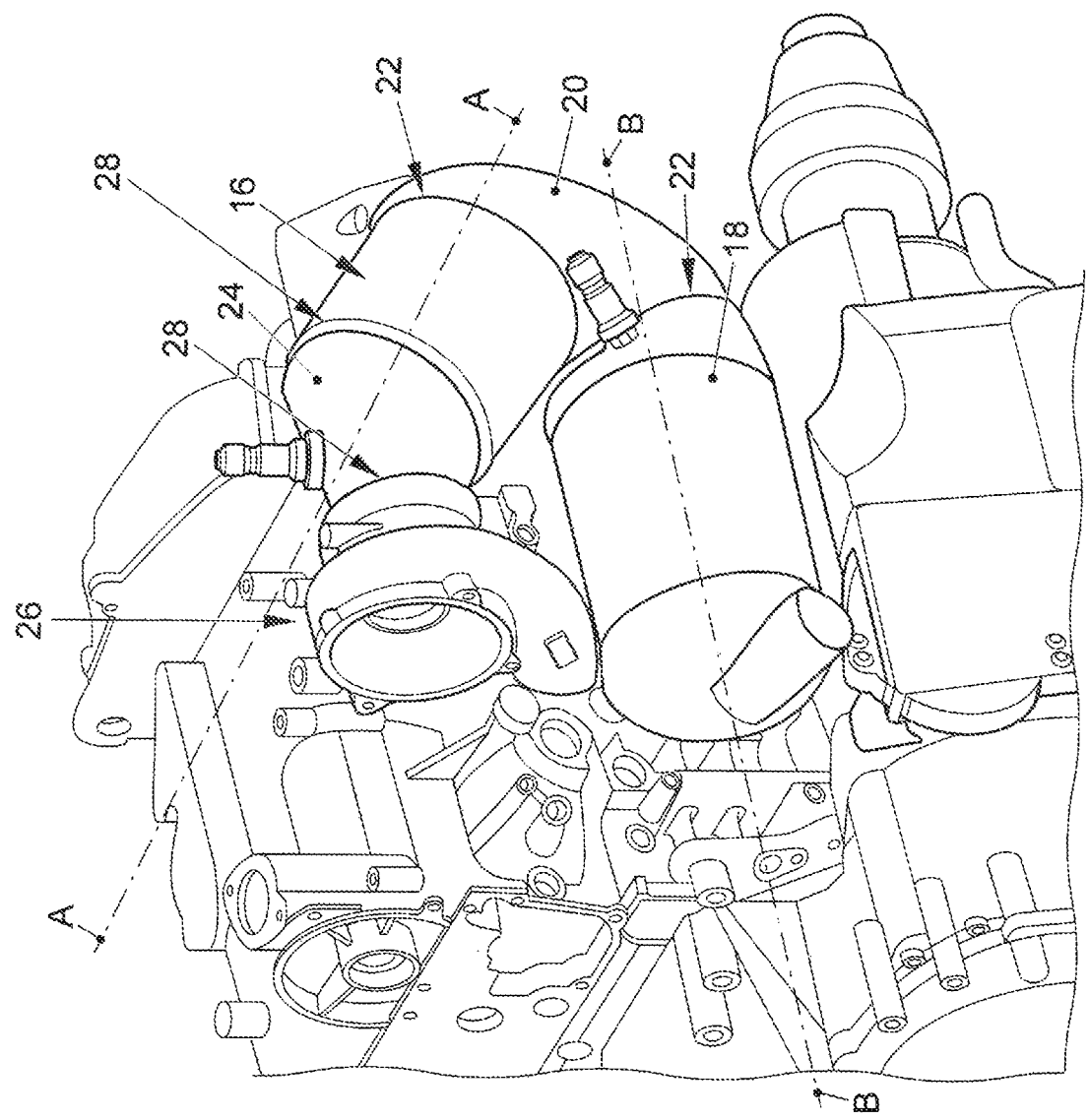
FIG. 12 shows an arrangement of two engine-compartment exhaust system components for an internal combustion engine of a motor vehicle installed in a hybrid unit.

FIG. 12 shows an arrangement of two engine-compartment exhaust system components for an internal combustion engine 12 of a motor vehicle installed in a hybrid unit.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The dimensions for the particulate filter, particularly the gasoline particulate filter, are: 0.118364 m×length: 0.1524 m (in inches, these dimensions are 4.66"×6.0").

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is illustrated only partially. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 30° in the clockwise direction. In other words, the three-way catalytic converter 16 is not only shown above the gasoline particulate filter 18 relative to the gasoline particulate filter 18, but also at an angle of approximately 30° relative to a respective central body axis of the respective exhaust system components.

The three-way catalytic converter 16 is also arranged directly on a manifold device 26 of the internal combustion engine 12 (shown only partially) by means of a second connecting body 24, the second connecting body 24 being designed to specify a relative installation position of the three-way catalytic converter 16 to the manifold device 26 on account of its connection points 28.

Figure 13:
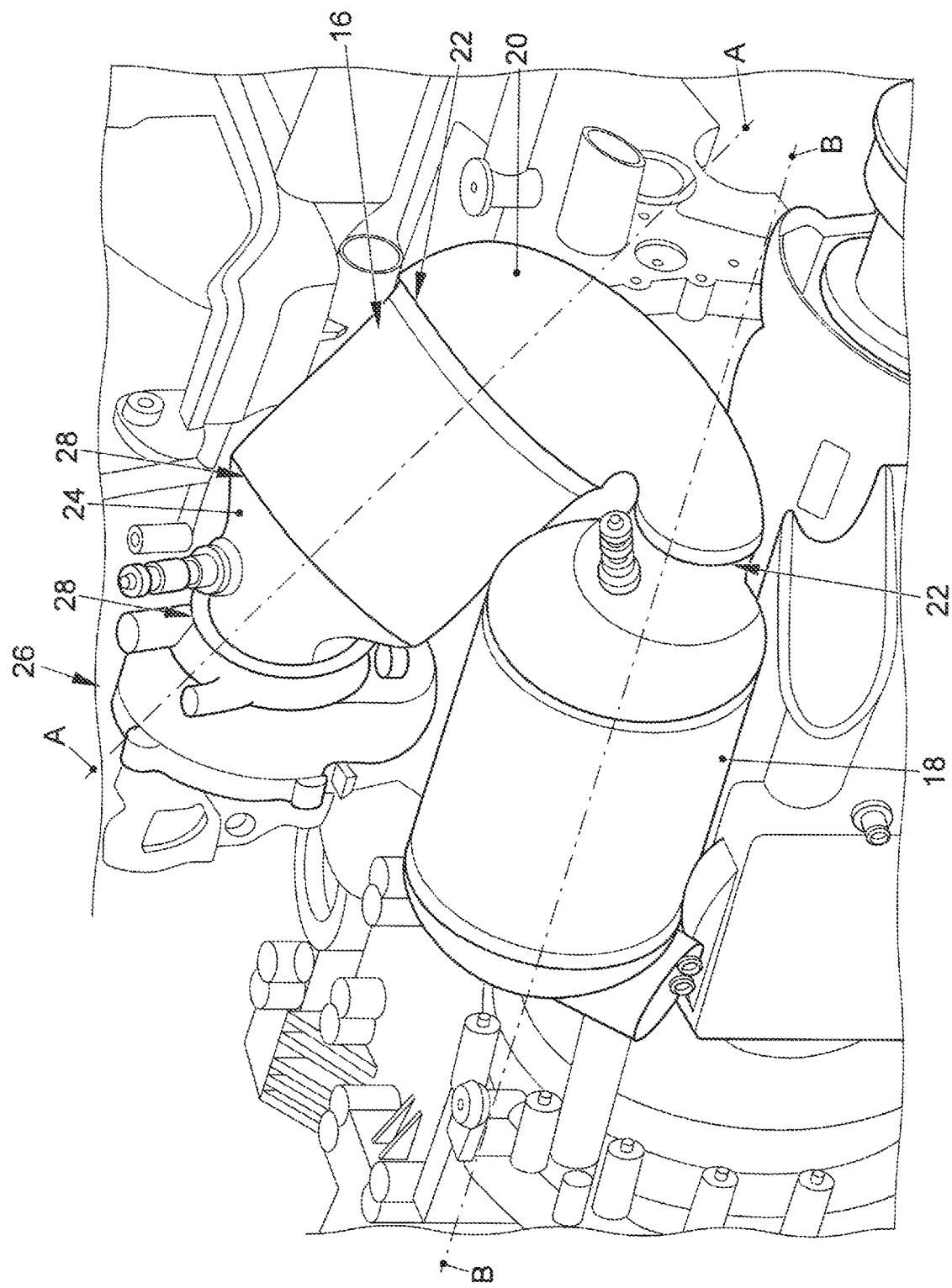
FIG. 13 shows another arrangement of two engine-compartment exhaust system components for an internal combustion engine of a motor vehicle installed in a hybrid unit.

FIG. 13 shows another arrangement of two engine-compartment exhaust system components for an internal combustion engine 12 of a motor vehicle installed in a hybrid unit.

One of the engine-compartment exhaust system components is a three-way catalytic converter 16 that is designed according to the invention, and the other component is a gasoline particulate filter 18 designed according to the invention. Both exhaust system components have a substantially cylindrical structure.

The three-way catalytic converter 16 is connected by means of a first connecting body 20 to the gasoline particulate filter 18 arranged downstream, the first connecting body 20 being designed, on account of its respective connection points 22, to specify an installation position of the three-way catalytic converter 16 relative to the gasoline particulate filter 18 and/or an installation position of the two engine-compartment exhaust system components relative to the internal combustion engine 12, which is illustrated only partially. In this case, this is a substantially horizontal installation position of the gasoline particulate filter 18 relative to an image plane and an installation position of the three-way catalytic converter 16 that is provided substantially to the side of the gasoline particulate filter 18. The connection point 22 that is provided for the three-way catalytic converter 16 has the same diameter as a diameter of the three-way catalytic converter 16.

Relative to a drawn-in centerline A-A of the three-way catalytic converter 16, a drawn-in centerline B-B of the gasoline particulate filter 18 is shown to be offset by an angle of approximately 30° in the clockwise direction. In other words, the three-way catalytic converter 16 is not only shown above the gasoline particulate filter 18 relative to the gasoline particulate filter 18, but also at an angle of approximately 30° relative to a respective central body axis of the respective exhaust system components.

Figure 14:
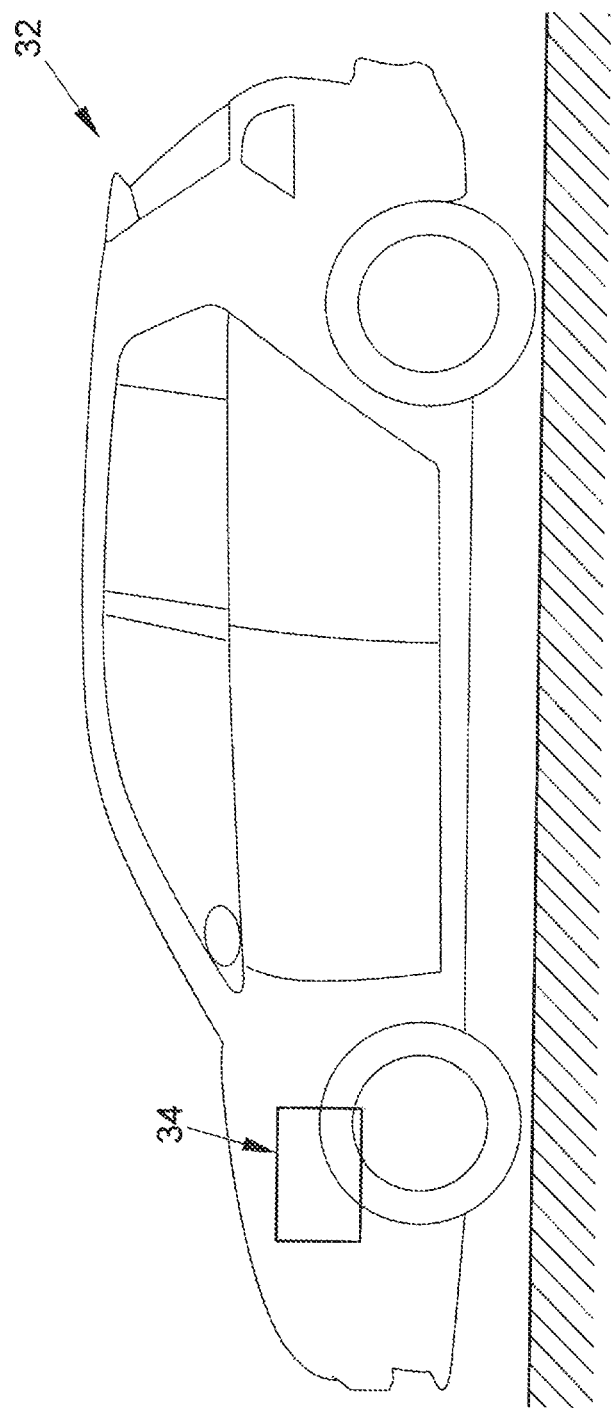
FIG. 14 shows a motor vehicle.

FIG. 14 shows a motor vehicle 32, with a possible installation location 34 showing an example of the location of an arrangement according to the claims. The motor vehicle 32 can be a passenger car or a utility vehicle, for example, it is possible for a respective unit or a respective internal combustion engine 12 (not shown in further detail in this case) to be a pure gasoline engine or a hybrid gasoline engine, for example.

LIST OF REFERENCE SYMBOLS 10 conventional three-way catalytic converter
12 internal combustion engine
14 conventional three-way catalytic converter gasoline particulate device
16 three-way catalytic converter
18 gasoline particulate filter
20 first connecting body
22 connection point of the second connecting body
24 second connecting body
26 manifold device
28 connection point of the first connecting body
30 recirculation line
32 motor vehicle 34 installation location
A-A centerline of the three-way catalytic converter
B-B centerline of the gasoline particulate filter

The invention claimed is:

1. An arrangement of at least two engine-compartment exhaust system components for an internal combustion engine of a motor vehicle comprising:
the at least two engine-compartment exhaust system components that are arranged one behind the other downstream from the internal combustion engine of the motor vehicle and are connected to one another by means of a first connecting body, so that exhaust gas from the internal combustion engine can be directed in succession through the at least two exhaust system components in the direction of an exhaust system,
wherein the at least two exhaust system components are also arranged behind a manifold device of the internal combustion engine by means of a second connecting body,
wherein a length from an outlet of a manifold device to an inlet of the exhaust gas system components arranged foremost in the exhaust gas flow direction is no more than 0.07 m,
wherein a first exhaust system component of the at least two exhaust system components is a three-way catalytic converter, and a second exhaust system component of the at least two exhaust system components is a gasoline particulate filter,
wherein the three-way catalytic converter is arranged foremost in the exhaust gas flow direction, and the particulate filter is arranged downstream from the three-way catalytic converter above the first connecting body, and
wherein the three-way catalytic converter is longer than it is wide, and the gasoline particulate filter is wider than it is long, and wherein dimensions for the three-way catalytic converter are width: from 0.110 to 0.125 m×length: from 0.144 to 0.157 m, and dimensions for the gasoline particulate filter are width: from 0.124 to 0.137 m×length: from 0.121 to 0.132 m.

2. The arrangement as set forth in claim 1, wherein the three-way catalytic converter has a diameter that is equal to or smaller than the gasoline particulate filter.

3. The arrangement as set forth in claim 1, wherein the first connecting body is smaller than the three-way catalytic converter and/or the first connecting body is smaller than the gasoline particulate filter.

4. The arrangement as set forth in claim 1, wherein the second connecting body is smaller than the three-way catalytic converter and/or the second connecting body is smaller than the gasoline particulate filter.

5. The arrangement as set forth in claim 1, wherein an exhaust gas recirculation system is arranged downstream from the three-way catalytic converter and the gasoline particulate filter.

6. The arrangement as set forth in claim 1, wherein at least one measuring device is provided in the first connecting body.

7. The arrangement as set forth in claim 1, wherein at least one measuring device is provided in the second connecting body.

8. A motor vehicle comprising:
an engine, and
the arrangement of at least two engine-compartment exhaust system components as set forth in claim 1.

* * * * *